United States Patent [19]

Sorensen

[11] Patent Number: 5,549,361
[45] Date of Patent: Aug. 27, 1996

[54] ELECTRONIC-HYDRAULIC BRAKE BOOST USING A POWER STEERING SUPPLY

[75] Inventor: Ronald L. Sorensen, Erie, Mich.

[73] Assignee: Kelsey-Hayes Corporation, Livonia, Mich.

[21] Appl. No.: 460,247

[22] Filed: Jun. 2, 1995

[51] Int. Cl.⁶ .................................................. F16D 31/02
[52] U.S. Cl. ........................... 303/3; 60/420; 60/422; 60/484; 91/459; 188/358; 303/2; 303/10; 303/84.1; 303/15; 137/100; 137/505; 180/405; 180/410; 180/415
[58] Field of Search ........................ 303/114.1, 2–3, 303/10–12; 188/358, 359; 60/591, 547.1, 422, 547.2, 548, 400, 484, 420; 180/132, DIG. 5, DIG. 6, 142, 132, 133, 140, 141; 91/459, 391 R; 137/505.18, 625.68, 625.69

[56] References Cited

U.S. PATENT DOCUMENTS

| | | | |
|---|---|---|---|
| 2,887,187 | 5/1959 | Fletcher | 188/358 |
| 3,170,536 | 2/1965 | Van Hose et al. | 180/133 |
| 3,279,558 | 10/1966 | Allen et al. | 180/133 |
| 3,575,192 | 4/1971 | MacDuff | 180/DIG. 5 |
| 3,579,987 | 5/1971 | Busse | 60/422 |
| 3,625,240 | 12/1971 | MacDuff | 180/133 |
| 3,662,548 | 5/1972 | Suzuki et al. | 180/DIG. 5 |
| 3,675,422 | 7/1972 | Drutchas et al. | 303/114.1 |
| 3,703,186 | 11/1972 | Brewer | 180/DIG. 5 |
| 3,712,332 | 1/1973 | Galbraith et al. | 137/505.18 |
| 3,802,746 | 4/1974 | Walser | 180/DIG. 5 |
| 3,811,472 | 5/1974 | Le Marchand | 137/625.68 |
| 3,841,096 | 10/1974 | Koppen et al. | 60/484 X |
| 3,901,342 | 8/1975 | Nunn, Jr. | 188/356 |
| 3,941,142 | 3/1976 | Adachi et al. | 60/422 |
| 3,968,814 | 7/1976 | Swanson et al. | 137/505.18 |
| 3,979,912 | 9/1976 | Kuromitsa | 91/391 R |
| 3,998,128 | 12/1976 | Adachi | 91/29 |
| 4,044,786 | 8/1977 | Yip | 137/101 |
| 4,123,117 | 10/1978 | Adachi | 303/114.1 |
| 4,236,595 | 12/1980 | Beck et al. | 60/420 |
| 4,387,782 | 6/1983 | Leiber | 180/142 |
| 4,420,934 | 12/1983 | Vdono | 60/484 |
| 4,549,564 | 10/1985 | Halabiya | 91/31 |
| 4,625,748 | 12/1986 | Muncke et al. | 60/422 |
| 4,672,885 | 6/1987 | Kervagoret | 180/142 |
| 4,676,334 | 6/1987 | Nakamura et al. | 180/142 |
| 4,706,546 | 11/1987 | Inoue et al. | 180/141 |
| 4,805,714 | 2/1989 | Nakamura et al. | 180/142 |
| 4,850,655 | 7/1989 | Takata et al. | 188/358 X |
| 4,852,462 | 8/1989 | Uchida et al. | 180/142 |
| 4,858,515 | 8/1989 | Karlberg | 180/DIG. 5 |
| 5,076,141 | 12/1991 | Konishi | 91/31 |
| 5,147,113 | 9/1992 | Nisonger et al. | 303/9.73 |
| 5,404,791 | 4/1995 | Kerragoret | 91/459 |
| 5,428,958 | 7/1995 | Stenlund | 60/445 |

*Primary Examiner*—Douglas C. Butler
*Attorney, Agent, or Firm*—Brooks & Kushman P.C.

[57] ABSTRACT

A vehicular brake booster using fluid pressurized by a hydraulic power steering system hydraulic pump. Fluid pressure is controlled by using a pressure regulator in the pump output and by electronically switching fixed orifices in a boost developing valve controlling fluid flow within the power steering system. Additional control is effected by electronically opening and closing apply and relief valves controlling fluid flow respectively to and from a brake power booster for differing periods.

20 Claims, 5 Drawing Sheets

5,549,361

ELECTRONIC-HYDRAULIC BRAKE BOOST USING A POWER STEERING SUPPLY

TECHNICAL FIELD

This invention relates generally to braking systems using power boost and specifically to such systems controlling fluid pressure obtained from a power steering supply to supplement brake boost.

BACKGROUND ART

Known systems previously attempting to use fluid pressurized by a power steering system to supply a brake power booster have used pressure regulators. Such systems result in the pressure of the fluid applied to the brake power booster increasing at an undesirably high rate if steering activity is initiated during braking activity.

While the prior apparatuses function with a certain degree of efficiency, none have the advantages attending the use of the electronic-hydraulic brake boost of the present invention, as is hereinafter more fully described.

DISCLOSURE OF THE INVENTION

An object of the present invention is to provide a an electronic brake boost system that is not affected by steering activity during braking activity or during normal driving.

A feature of the present invention is the control of fluid pressure by using a pressure regulator and by electronically switching fixed orifices in a boost developing valve and electronically opening and closing apply and relief valves for differing periods.

An advantage of the present invention is that it maintains the pressure of fluid applied to a boost piston within reasonably low, predictable levels.

In realizing the aforementioned and other objects, features and advantages, the electronically controlled automotive hydraulic brake boost system of the present invention shares a hydraulic pump with a power steering system. The pump has an input and an output. It shares a torque-sensitive four-way valve, which has an input and an output, and also shares a reservoir.

The hydraulic brake boost system includes a boost developing valve that has a normally open one-way path and a one-way flow restrictor path. The boost developing valve has an input connected to the output of the power steering hydraulic pump, and it has an output connected to the input of the torque-sensitive four-way valve. The outputs of the torque-sensitive four-way valve and of the hydraulic pump are connected to the reservoir.

A boost check valve, having an input and an output, has its input connected to the output of the hydraulic pump and to the input of the boost developing valve. A boost apply valve, having a normally closed path and a one-way open path and having an input and an output, has its input connected to the output of boost check valve. The output of the boost apply valve is connected to a first input of a brake power booster.

A boost relief valve, having a normally open one-way path and a closed path and having an input and an output, has its input connected to the first input of the brake power booster and to the output of the boost apply valve and its output connected to the reservoir.

A failed power steering accumulator, having an input and an output, is also included. An accumulator check valve has an input connected to the input of the boost developing valve and to the output of the power steering hydraulic pump and an output connected to the accumulator.

A failed power steering auxiliary apply valve has a normally closed path and an open one-way path. It has an input connected to the output of the failed power steering accumulator and an output connected to the input of the boost relief valve. A pressure regulator is interposed between the boost check valve and the boost apply valve and has an input and an output. Its input is connected to the output of the boost check valve, and its output is connected to the input of the boost apply valve.

These and other objects, features and advantages of the present invention are readily apparent from the following detailed description of the best mode for carrying out the invention when taken in connection with the accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
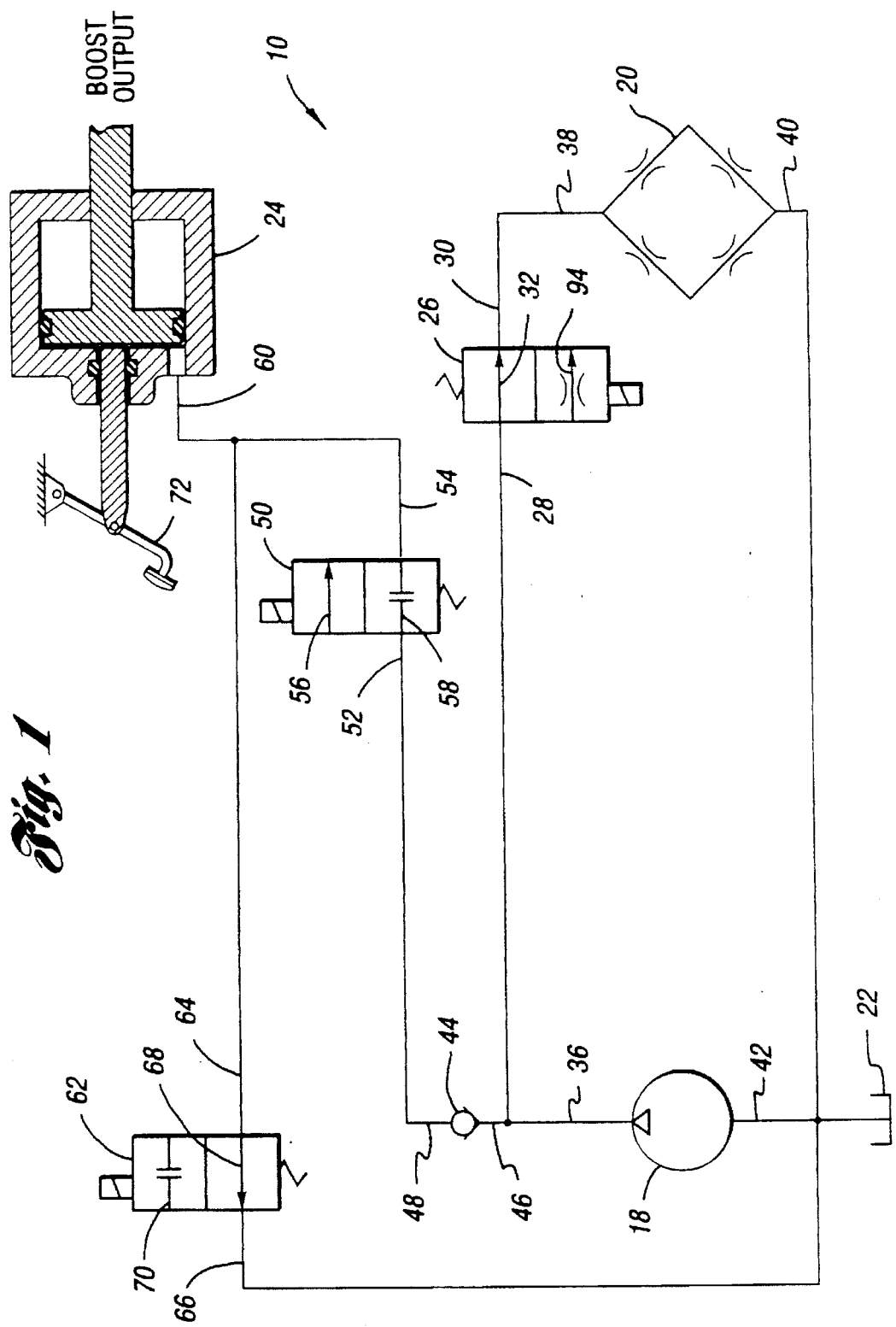
FIG. 1 is a schematic diagram illustrating an electronically controlled automotive hydraulic brake boost system of the present invention.

FIG. 1 of the drawings schematically shows a first embodiment of an electronically controlled automotive hydraulic brake boost system, generally indicated by reference numeral 10, of the present invention. It uses existing power steering system components including a hydraulic pump 18, a torque-sensitive four-way valve 20, and a reservoir 22 to provide fluid under pressure to a brake power booster 24, a typical representation of which is shown by the sectional view.

A boost developing valve 26 has an input 28 and an output 30 and has a normally open one-way path 32 and a one-way flow restrictor path 34. Its input 28 is connected to an output 36 of the hydraulic pump 18, and its output 30 is connected to an input 38 of the torque-sensitive four-way valve 20. An output 40 of the torque-sensitive four-way valve 20 and an input 42 of the hydraulic pump are connected to the reservoir 22. The one-way flow restrictor path 34 of the boost developing valve 26 has an orifice the diameter of which is within the range of 0.050 and 0.150 inch and is preferably 0.093 inch.

A boost check valve 44 has an input 46 and an output 48. Its input 46 being connected to the output 36 of the hydraulic pump 18 and to the input 28 of the boost developing valve 26. A boost apply valve 50 has an input 52 and an output 54. It also has a normally closed path 56 and a one-way open path 58, and its input 52 is connected to the output 48 of boost check valve 44, its output 54 being connected to a primary input 60 of the brake power booster 24.

A boost relief valve 62 has an input 64 and an output 66. It also has a normally open one-way path 68 and a closed path 70. Its input 64 is connected to the primary input 60 of the brake power booster 24 and to the output 54 of the boost apply valve 50, its output 66 being connected to the reservoir 22.

The boost developing valve 26, the boost apply valve 50 and the boost relief valve 62 are each actuated by an electric solenoid, the solenoids being controlled by one of any well-known automotive electronic control units (not shown) designed for this purpose.

In response to a force being applied to the brake pedal 72, the boost developing valve 26 is actuated. This transfers fluid flow through the valve 26 from the normally open one-way path 32 to the one-way flow restricted path 34, which has the effect of increasing the fluid pressure, typically to at least 600 pound per square inch (psi) from a normal power steering pump output pressure without steering of about 40 psi, at the boost check valve 44.

The boost apply valve 50 is actuated to permit fluid flow through its one-way open path 56 to the input 60 of the brake power booster 24. The boost relief valve 62 is also actuated, preventing fluid from flowing through its normally open one-way path 68 to the reservoir 22. The fluid pressure applied to the brake power booster 24 can be controlled by periodically transferring the states of the boost apply valve 50 and the boost relief valve 62 for appropriate intervals of time, during which pressurized fluid is allowed to exhaust to the reservoir 22.

Figure 2:
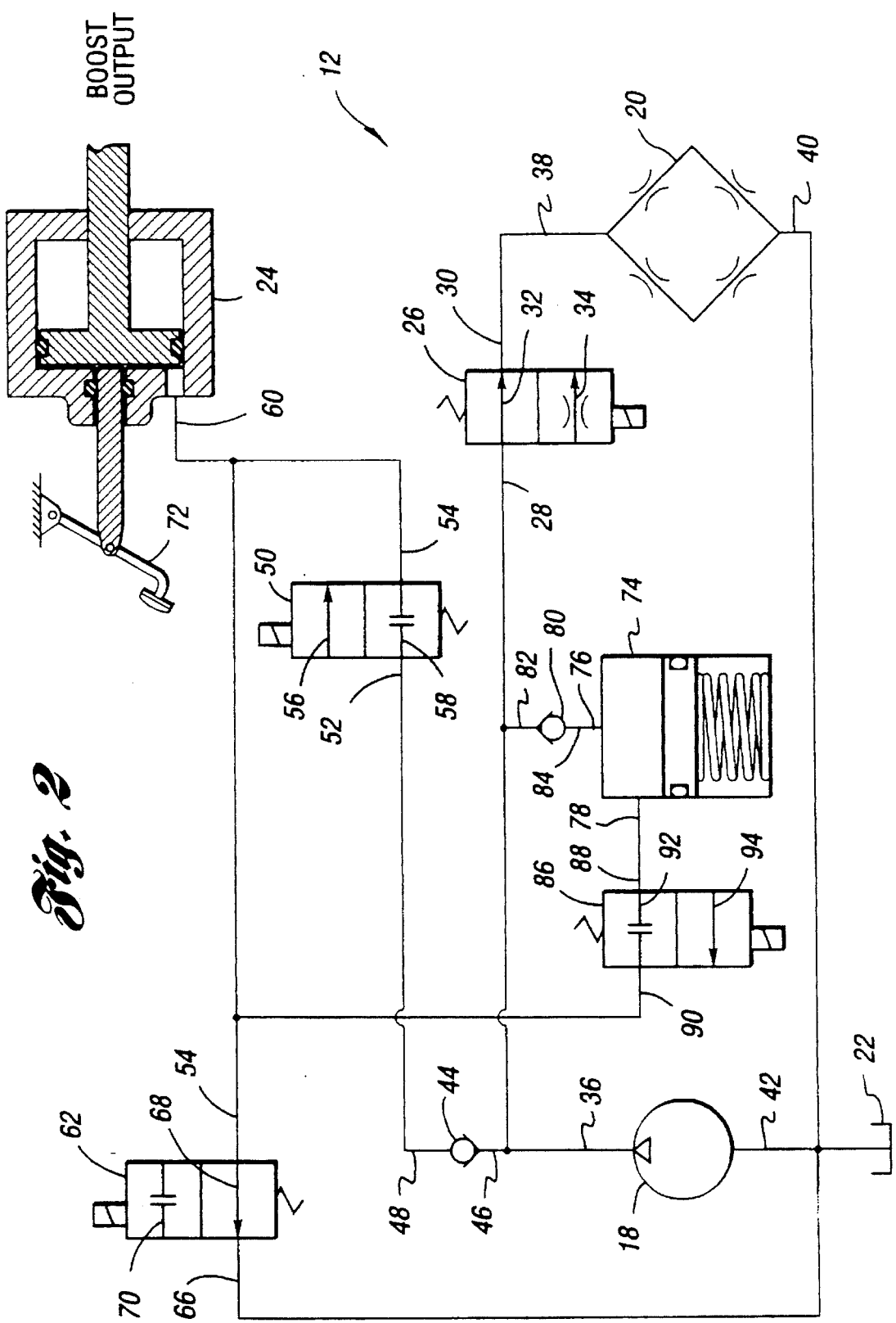
FIG. 2 is a schematic diagram similar to that of FIG. 1 and illustrating an additional embodiment of the present invention.

FIG. 2 of the drawings is similar to FIG. 1 and shows a second embodiment of an electronically controlled automotive hydraulic brake boost system, generally indicated by reference numeral 12, of the present invention. In addition to the elements of the first embodiment, the second embodiment includes a failed power steering system accumulator 74, which has an input 76 and an output 78. The accumulator 74 typically has a pressure range between 250 and 600 psi.

An accumulator check valve 80 has an input 82 connected to the input 28 of the boost developing valve 26 and to the output 36 of the power steering system hydraulic pump 18. It has an output 84 connected to the accumulator 74. A failed power steering system auxiliary apply valve 86 has a normally closed path 92 and an open one-way path 94. It has an input 88 connected to the output 78 of the failed power steering system accumulator 74 and an output 90 connected to the primary input of the brake pressure booster 24 and to the input 64 of the boost relief valve 62.

The failed power steering system auxiliary apply valve 86 is actuated by an electric solenoid, which is controlled, as are the valves mentioned previously, by one of any well-known automotive electronic control units (not shown) designed for this purpose. Should the power steering system fail, for example, as a result of an engine stall, the failed power system auxiliary apply valve 86 would be actuated. This would allow fluid under pressure in the accumulator 74 to flow through the one-way path 94 to the primary input of the brake pressure booster 24.

Figure 3:
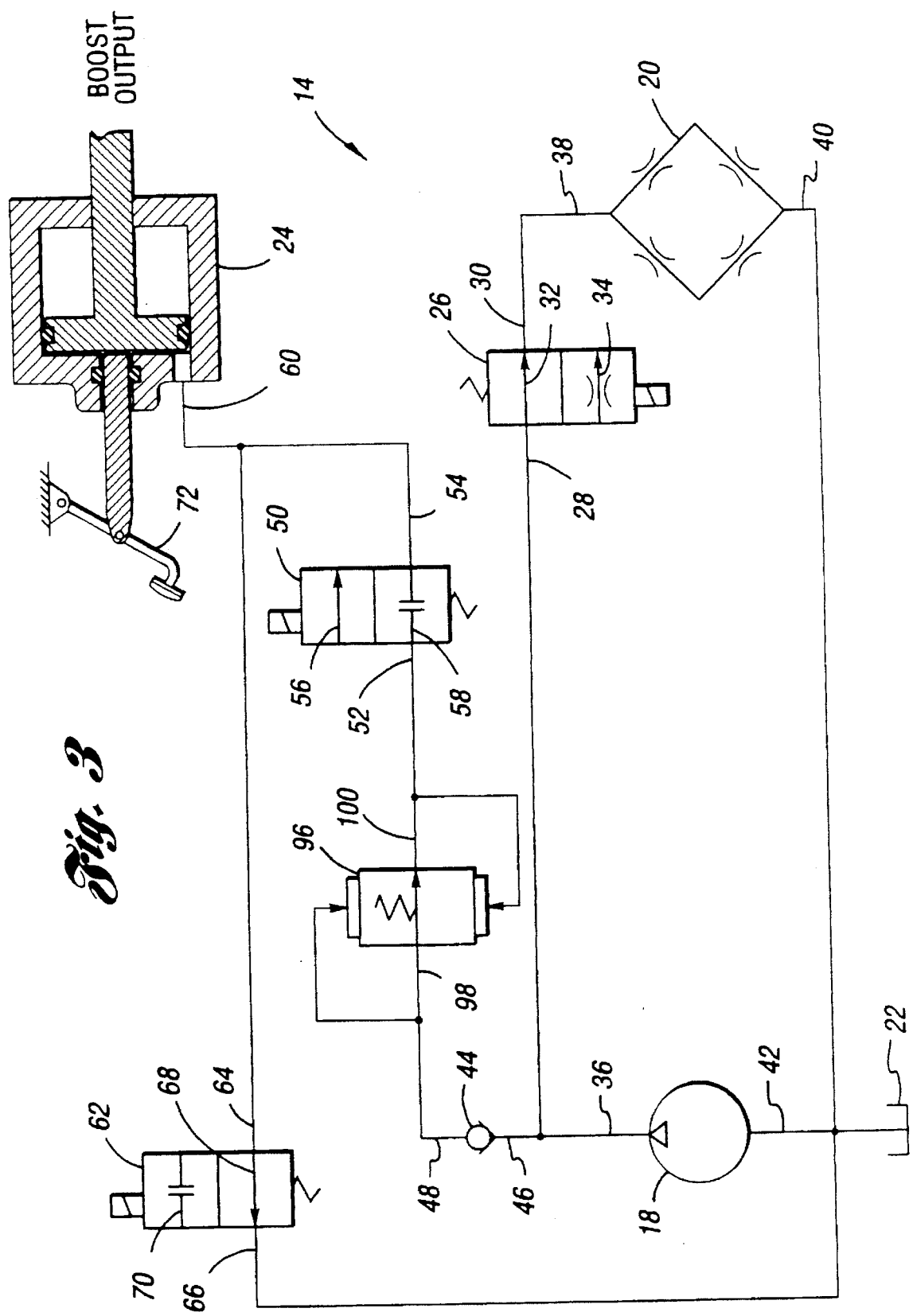
FIG. 3 is a schematic diagram similar to that of FIG. 2 and illustrating an additional embodiment of the present invention.

FIG. 3 of the drawings is similar to FIG. 1 and shows a third embodiment of an electronically controlled automotive hydraulic brake boost system, generally indicated by reference numeral 14, of the present invention. In addition to the elements of the first embodiment, the third embodiment includes a pressure regulator 96 having an input 98 and an output 100. The pressure regulator 96 is interposed between the boost check valve 44 and the boost apply valve 50. The input 98 of the pressure regulator 96 is connected to the output 48 of the boost check valve 44, and its output 100 is connected to the input 52 of the boost apply valve 50.

When the boost developing valve 26 is actuated in response to a force being applied to the brake pedal 72, fluid flow is transferred through the valve 26 from the normally open one-way path 32 to the one-way flow restricted path 34. This has the effect of increasing the fluid pressure, typically to at least 600 psi, at the boost check valve 44.

At the same time, the boost apply valve 50 is actuated to permit fluid flow through its one-way open path 56 to the input 60 of the brake power booster 24, and fluid passes through the pressure regulator 96. At this time, the boost relief valve 62 is also actuated, preventing fluid from flowing through its normally open one-way path 68 to the reservoir 22.

The pressure regulator 96 allows fluid to be supplied to the boost apply valve 50 at a typical pressure up to 600 psi. Any pressure exceeding that is limited by the pressure regulator 96 to a value less than that supplied. As previously mentioned in the description of the first embodiment, the fluid pressure applied to the brake power booster 24 can be additionally controlled by periodically transferring the states of the boost apply valve 50 and the boost relief valve 62 for appropriate intervals of time, during which pressurized fluid is allowed to exhaust to the reservoir 22.

Alternatively, the embodiments of FIGS. 1, 2 and 3 can be combined as a single system.

Figure 5:
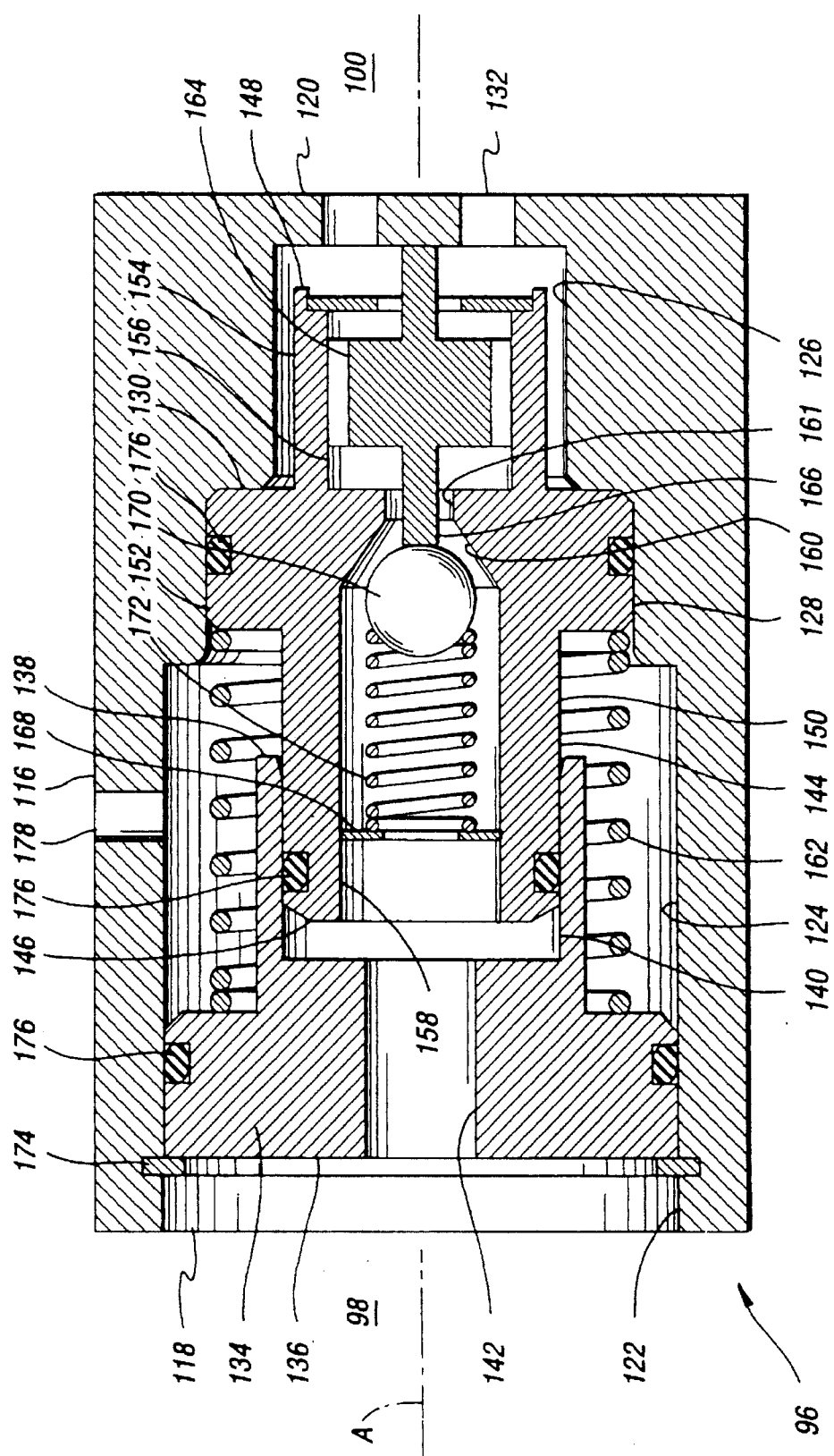
FIG. 5 is a sectional view illustrating details of an element of the combination of the present invention.

FIG. 5 of the drawings is a sectional view of the pressure regulator 96. It has an elongate housing 116 having an input end 118 and an output end 120 and a main axis A. The housing 116 has therein a stepped bore 122 concentrically extending along the main axis A. The stepped bore 122 has an input portion 124 extending inwardly from the input end 118 of the housing 116, an output portion 126 extending inwardly from a point proximate the output end 120, and an intermediate portion 128 extending between the input 124 and output 126 portions.

The area between the intermediate portion 128 and the output portion 126 forms a piston stop 130. The output end 120 of the housing 116 has at least one output port 132 therethrough extending inwardly to the output portion 126 of the stepped bore 122. The input portion 124 of the stepped bore 122 has a larger diameter than does the intermediate portion 128, which has a larger diameter than does the output portion 126.

The pressure regulator also includes an elongate sleeve member 134 having a first end 136 and a second end 138. It is disposed in the input portion 124 of the stepped bore 122 with its first end 136 proximate the input end 118 of the pressure regulator housing 116. The sleeve member 134 has a sleeve recess 140 concentrically extending inwardly from its second end 138 along the main axis A. The sleeve member 134 also has a sleeve member central bore 142 extending from its first end 136 to the sleeve recess 140.

A pressure regulator piston 144 has a first end 146 and a second end 148. It also has an elongate skirt portion 150 slidably received within the sleeve recess 140. The pressure regulator piston 144 also has a shoulder portion 152 slidably received within the intermediate portion 128 of the housing 116. The pressure regulator piston 144 has a leading portion 154 extending from the shoulder portion 152 to the second end 148 thereof. The leading portion 154 is in substantial clearance relation to the bore of output portion 126 and has a diameter smaller than that of the skirt portion 150, which has a diameter smaller than does the shoulder portion 152.

The leading portion 154 has therewithin a leading portion recess 156 concentrically extending along the main axis A inwardly from the second end 148 of the pressure regulator piston 144 to the shoulder portion 152. The pressure regulator piston 144 has a central piston bore 158 concentrically extending along the main axis A from the first end 146 of the pressure regulator piston 144 to the leading portion recess 156. The diameter of the central piston bore 158 linearly decreases near the leading portion recess 156 to form a valve ball seat 160 and port 161 connecting to recess 156.

A piston spring 162 is disposed between the sleeve member 134 and the shoulder portion 152 of the pressure regulator piston 144 to resiliently bias the shoulder portion 152 against the piston stop 130 which is the shoulder of adjoining bore portions 126 and 128. A ball locating member 164 is fixedly disposed within the leading portion recess 156 and has a ball locator 166, in the form of a pin, extending into the central piston bore 158 to a point proximate the valve ball seat 160.

A ball spring retainer 168 is fixedly disposed within the central piston bore 158 proximate the first end 146 of the pressure regulator piston 144. A valve ball 170 is disposed within the central piston bore 158. A ball spring 172, or valve return spring, is disposed between the valve ball 170 and the ball spring retainer 168 to resiliently urge the valve ball 170 against the ball locator 166 when the shoulder portion 152 of the pressure regulator piston 144 is against the piston stop 130 and to resiliently urge the valve ball 170 against the valve ball seat 160 when the shoulder portion 152 has been forced away from the piston stop 130.

Completing the assembly, sleeve 134 is secured relative to housing 116 by a snap ring 174, and 0-ring seals 176 seal off fluid flowing past adjoining members 116, 134 and 144. Also air vent 178 is provided in the sleeve 174.

With reference to FIG's. 3 and 5, if the fluid pressure appearing at the primary input 60 of the brake power booster 24, and therefore at the output 100 of the pressure regulator 96, exceeds the fluid pressure appearing at the input 98 by an amount sufficient to overcome the resilient bias of the piston spring 162, then the pressure regulator piston 144 is forced toward the input end 118 of the pressure regulator housing 116. The valve ball 170 is retained in position against the ball locator 166 by the ball spring 172 until lifted away therefrom by the valve ball seat 160. With the valve ball 170 against the valve ball seat 160, fluid flow through the pressure regulator 96 is interrupted.

If pressure at the input 98 of the pressure regulator 96 continues to increase, the pressure regulator piston 144 is forced toward the output end 120 of the pressure regulator housing 116. As it also moves in the same direction, the valve ball seat 160 deposits the valve ball 170 onto the end of the ball locator 166 allowing fluid to flow through the pressure regulator 96 again. The amount of actual relative movement between the valve ball 170 and the valve ball seat 160 is typically very small. Shoulder portion 152 is preferably always fully supported on the support land provided by intermediate portion 128. If fluid pressure at the input 98 of the pressure regulator 96 continues to rise, fluid pressure at its output 100, and at the primary input 60 of the brake power booster 24, also continues to rise. The rate of increase of the output pressure, however, is only a percentage of that of the input pressure.

Figure 4:
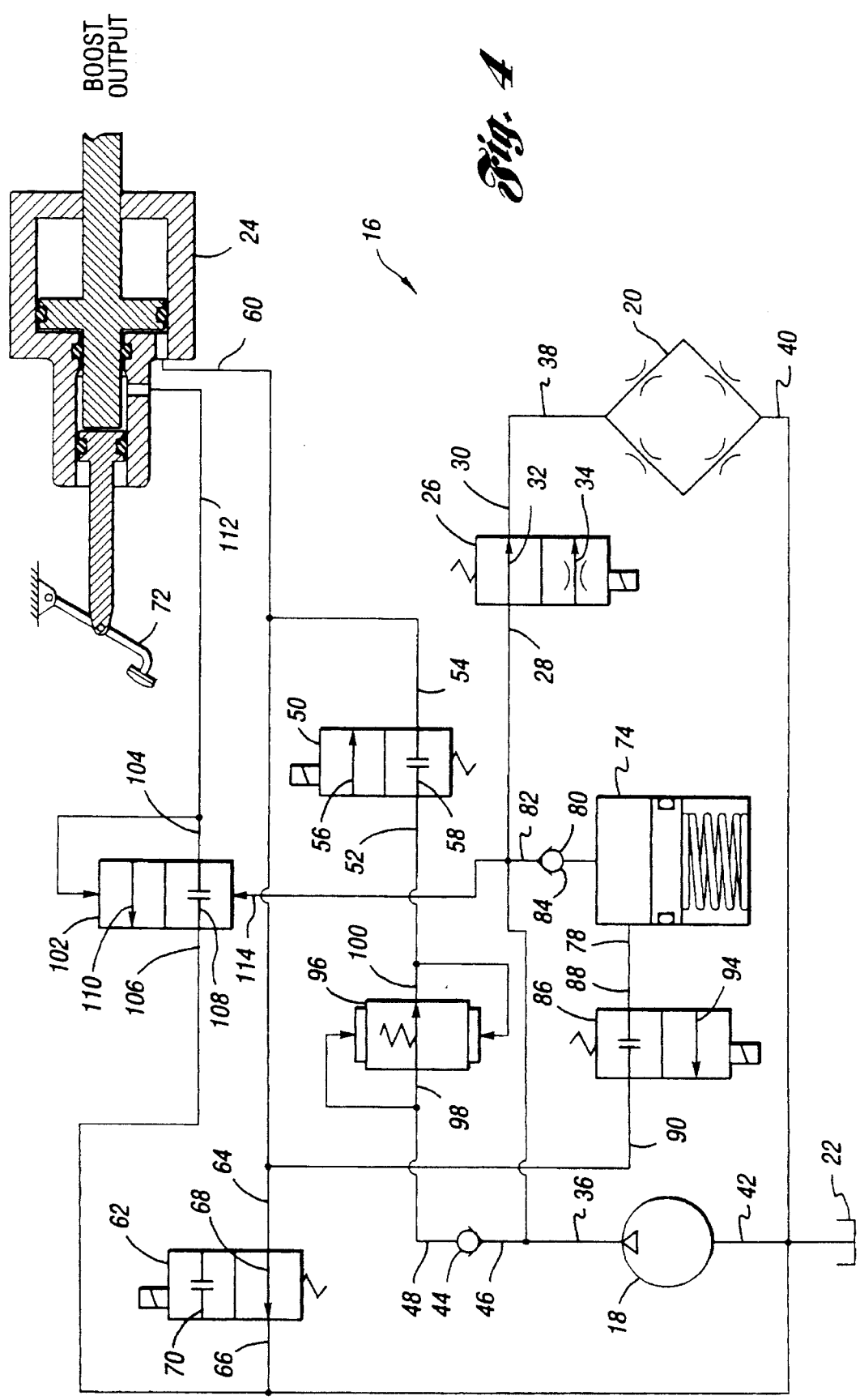
FIG. 4 is a schematic diagram similar to that of FIG. 3 and illustrating an additional embodiment of the present invention.

FIG. 4 of the drawings is similar to FIG's. 2 and 3 and shows a fourth embodiment of an electronically controlled automotive hydraulic brake boost system, generally indicated by reference numeral 16, of the present invention. In addition to the elements of the second and third embodiments, the fourth embodiment includes a pressure actuated (pilot valve type) failed power steering system relief valve 102 having a normally closed path 108 and a one-way open path 110. It has an input 104 connected to a secondary input 112 of the brake power booster 24 and an output 106 connected to the output 66 of the boost relief valve 62 and to the reservoir 22.

The failed power steering system auxiliary apply valve 86 is actuated by an electric solenoid, which is controlled, as are the valves mentioned previously, by one of any well-known automotive electronic control units (not shown) designed for this purpose. Should the power steering system fail, for example, as a result of an engine stall, the power steering system hydraulic pump 18 would stop, and fluid pressure at its output 36 would drop. The failed power system auxiliary apply valve 86 would be actuated. This would allow fluid under pressure in the accumulator 74 to flow through the one-way path 94 to the primary input of the brake pressure booster 24.

The fluid pressure at the power steering system failure input 114 would also drop, resulting in the actuation of the failed power steering system valve 102. When this valve 102 actuates, pressurized fluid is allowed to escape from the secondary input 112 of the brake power booster 24, through the one-way open path of the valve 102, to the reservoir 22.

While the best mode for carrying out the invention has been described in detail, those familiar with the art to which this invention relates will recognize various alternative designs and embodiments for practicing the invention as defined by the following claims.

What is claimed is:

1. An electronically controlled vehicular hydraulic brake boost system sharing a hydraulic pump with the power steering system of the vehicle to provide fluid under pressure to a brake power booster, the hydraulic brake boost system comprising:

a brake power booster;

a boost developing valve having a normally open path and a flow restrictor path, the boost developing valve having an input connected to an output of the hydraulic pump and an output connected to said brake power booster; and valve means for closing said open path upon initiating brake actuation and thereby forcing fluid through said flow restriction path to significantly boost fluid pressure from the pump output to a level useful in the brake boost system.

2. The brake boost system of claim 1 wherein said valve means comprises:

a boost apply valve having a normally closed path and a open path, the boost apply valve having an input and an output, its input being connected to the output of boost check valve and its output being connected to a primary input of the brake power booster;

and a boost relief valve having a normally open path and a closed path, the boost relief valve having an input and an output, its input being connected to the primary input of the brake power booster and to the output of the boost apply valve and its output being connected to a reservoir.

3. The brake boost system of claim 2 wherein said valve means further comprises a boost check valve having an input and an output, its input being connected to the output of the hydraulic pump and to the input of the boost developing valve.

4. An electronically controlled vehicular hydraulic brake boost system sharing a hydraulic pump, a torque-sensitive four-way valve, and a reservoir of the vehicle power steering system to provide fluid under pressure to a brake power booster, the hydraulic brake boost system comprising:

a boost developing valve having a normally open path and a flow restrictor path, the boost developing valve having an input connected to an output of the hydraulic pump and an output connected to an input of the torque-sensitive four-way valve, an output of the torque-sensitive four-way valve and an input of the hydraulic pump being connected to the reservoir;

a boost check valve having an input and an output, its input being connected to the output of the hydraulic pump and to the input of the boost developing valve;

a boost apply valve having a normally closed path and a open path, the boost apply valve having an input and an output, its input being connected to the output of boost check valve and its output being connected to a primary input of the brake power booster;

and a boost relief valve having a normally open path and a closed path, the boost relief valve having an input and an output, its input being connected to the primary input of the brake power booster and to the output of the boost apply valve and its output being connected to the reservoir.

5. The brake boost system of claim 4, further including:

a failed power steering system accumulator having an input and an output;

an accumulator check valve having an input connected to the input of the boost developing valve and to the output of the power steering system hydraulic pump and an output connected to the failed power steering system accumulator; and a failed power steering system auxiliary apply valve having a normally closed path and an open path, the failed power steering system auxiliary apply valve having an input connected to the output of the failed power steering system accumulator and an output connected to the primary input of the brake pressure booster and to the input of the boost relief valve.

6. The brake boost system of claim 5, wherein the boost developing valve, the boost apply valve and the boost relief valve are each solenoid controlled.

7. The electronically controlled automotive hydraulic brake boost system of claim 6, wherein the flow restrictor path of the boost developing valve has an orifice the diameter of which is within a range between 0.050 and 0.150 inch.

8. The brake boost system of claim 7, wherein the fluid pressure range of the failed power steering system accumulator is between 250 and 600 psi.

9. The brake boost system of claim 4 further including a pressure regulator interposed between the boost check valve and the boost apply valve, the pressure regulator having an input and an output, its input being connected to the output of the boost check valve and its output being connected to the input of the boost apply valve.

10. The brake boost system of claim 9, wherein the pressure regulator comprises:

an elongate housing having an input end and an output end and a main axis, the housing having therein a stepped bore concentrically extending along the main axis, the stepped bore having an input portion extending inwardly from the input end of the housing, an output portion extending inwardly from a point proximate the output end, and an intermediate portion extending between the input and output portions, the area between the intermediate portion and the output portion forming a piston stop, the output end of the housing having at least one output port therethrough extending inwardly to the output portion of the stepped bore, the input portion of the stepped bore having a larger diameter than does the intermediate portion, which has a larger diameter than does the output portion;

an elongate sleeve member having a first end and a second end and being disposed in the input portion of the stepped bore with its first end proximate the input end of the housing, the sleeve member having a sleeve recess concentrically extending inwardly from its second end along the main axis, the sleeve member also having a sleeve member central bore extending from its first end to the sleeve recess;

a pressure regulator piston having a first end and a second end and an elongate skirt portion slidably received within the sleeve recess, the pressure regulator piston also having a shoulder portion slidably received within the intermediate portion of the housing, the pressure regulator piston having a leading portion extending from the shoulder portion to the second end thereof, the leading portion having a diameter smaller than that of the skirt portion, which has a diameter smaller than does the shoulder portion, the leading portion having therewithin a leading portion recess concentrically extending along the main axis inwardly from the second end of the pressure regulator piston to the shoulder portion, the pressure regulator piston having a central piston bore concentrically extending along the main axis from the first end of the pressure regulator piston to the leading portion recess, the diameter of the central piston bore linearly decreasing near the leading portion recess to form a valve ball seat;

a piston spring disposed between the sleeve member and the shoulder portion of the pressure regulator piston to resiliently bias the shoulder portion against the piston stop;

a ball locating member being fixedly disposed within the leading portion recess and having a ball locator extending into the central piston bore to a point proximate the valve ball seat;

a ball spring retainer fixedly disposed within the central piston bore proximate the first end of the pressure regulator piston;

a valve ball disposed within the central piston bore; and a ball spring disposed between the valve ball and the ball spring retainer to resiliently urge the valve ball against the ball locator when the shoulder portion of the pressure regulator piston is against the piston stop and to resiliently urge the valve ball against the valve ball seat when the shoulder portion has been forced away from the piston stop.

11. The brake boost system of claim 9, further including:

a failed power steering system accumulator having an input and an output;

an accumulator check valve having an input connected to the input of the boost developing valve and to the output of the power steering system hydraulic pump and an output connected to the failed power steering system accumulator;

a failed power steering system auxiliary apply valve having a normally closed path and an open path, the failed power steering system auxiliary apply valve having an input connected to the output of the failed power steering system accumulator and an output connected to the input of the boost relief valve; and a failed power steering system relief valve having a normally closed path and an open path, the failed power steering system relief valve having an input and an output, its input being connected to a secondary input of the brake power booster and its output being connected to the output of the boost relief valve and to the reservoir.

12. The brake boost system of claim 11, wherein the boost developing valve, the boost apply valve and the boost relief valve are each solenoid controlled.

13. The brake boost system of claim 12, wherein the flow restrictor path of the boost developing valve has an orifice the diameter of which is within a range between 0.050 and 0.150 inch.

14. The brake boost system of claim 13, wherein the fluid pressure range of the failed power steering system accumulator is between 250 and 600 psi.

15. An electronically controlled automotive hydraulic brake boost system sharing a hydraulic pump, a torque-sensitive four-way valve, and a reservoir of the vehicle power steering system to provide fluid under pressure to a brake power booster, the hydraulic brake boost system comprising:

a boost developing valve having a normally open one-way path and a one-way flow restrictor path, the boost developing valve having an input connected to an output of the hydraulic pump and an output connected to an input of the torque-sensitive four-way valve, an output of the torque-sensitive four-way valve and an input of the hydraulic pump being connected to the reservoir;

a boost check valve having an input and an output, its input being connected to the output of the hydraulic pump and to the input of the boost developing valve;

a pressure regulator having an input and an output, its input being connected to the output of the boost check valve;

a boost apply valve having a normally closed path and a one-way open path, the boost apply valve having an input and an output, its input being connected to the output of the pressure regulator and its output being connected to a primary input of the brake power booster;

a boost relief valve having a normally open one-way path and a closed path, the boost relief valve having an input and an output, its input being connected to the primary input of the brake power booster and to the output of the boost apply valve and its output being connected to the reservoir;

a failed power steering system accumulator having an input and an output;

an accumulator check valve having an input connected to the input of the boost developing valve and to the output of the power steering system hydraulic pump and an output connected to the failed power steering system accumulator;

a failed power steering system auxiliary apply valve having a normally closed path and an open one-way path, the failed power steering system auxiliary apply valve having an input connected to the output of the failed power steering system accumulator and an output connected to the input of the boost relief valve; and a failed power steering system relief valve having a normally closed path and an open one-way path, the failed power steering system relief valve having an input and an output, its input being connected to a secondary input of the brake power booster and its output being connected to the output of the boost relief valve and to the reservoir.

16. The brake boost system as defined by claim 15, wherein the pressure regulator comprises:

an elongate housing having an input end and an output end and a main axis, the housing having therein a stepped bore concentrically extending along the main axis, the stepped bore having an input portion extending inwardly from the input end of the housing, an output portion extending inwardly from a point proximate the output end, and an intermediate portion extending between the input and output portions, the area between the intermediate portion and the output portion forming a piston stop, the output end of the housing having at least one output port therethrough extending inwardly to the output portion of the stepped bore, the input portion of the stepped bore having a larger diameter than does the intermediate portion, which has a larger diameter than does the output portion;

an elongate sleeve member having a first end and a second end and being disposed in the input portion of the stepped bore with its first end proximate the input end of the housing, the sleeve member having a sleeve recess concentrically extending inwardly from its second end along the main axis, the sleeve member also having a sleeve member central bore extending from its first end to the sleeve recess;

a pressure regulator piston having a first end and a second end and an elongate skirt portion slidably received within the sleeve recess, the pressure regulator piston also having a shoulder portion slidably received within the intermediate portion of the housing, the pressure regulator piston having a leading portion extending from the shoulder portion to the second end thereof, the leading portion having a diameter smaller than that of the skirt portion, which has a diameter smaller than does the shoulder portion, the leading portion having therewithin a leading portion recess concentrically extending along the main axis inwardly from the second end of the pressure regulator piston to the shoulder portion, the pressure regulator piston having a central piston bore concentrically extending along the main axis from the first end of the pressure regulator piston to the leading portion recess, the diameter of the central piston bore linearly decreasing near the leading portion recess to form a valve ball seat;

a piston spring disposed between the sleeve member and the shoulder portion of the pressure regular piston to resiliently bias the shoulder portion against the piston stop;

a ball locating member being fixedly disposed within the leading portion recess and having a ball locator extending into the central piston bore to a point proximate the valve ball seat;

a ball spring retainer fixedly disposed within the central piston bore proximate the first end of the pressure regulator piston;

a valve ball disposed within the central piston bore; and a ball spring disposed between the valve ball and the ball spring retainer to resiliently urge the valve ball against the ball locator when the shoulder portion of the pressure regulator piston is against the piston stop and to resiliently urge the valve ball against the valve ball seat when the shoulder portion has been forced away from the piston stop.

17. The brake boost system of claim 15, wherein the boost developing valve, the boost apply valve and the boost relief valve are each solenoid controlled.

18. The brake boost system of claim 17, wherein the one-way flow restrictor path of the boost developing valve has an orifice the diameter of which is within a range between 0.050 and 0.150 inch.

19. The brake boost system of claim 18, wherein the fluid pressure range of the failed power steering system accumulator is between 250 and 600 psi.

20. A pressure regulating valve assembly for use in an hydraulic brake boost system comprising:

an elongate housing having an input end and an output end and a main axis, the housing having therein a stepped bore concentrically extending along the main axis, the stepped bore having an input portion extending inwardly from the input end of the housing, an output portion extending inwardly from a point proximate the output end, and an intermediate portion extending between the input and output portions, the area between the intermediate portion and the output portion forming a piston stop, the output end of the housing having at least one output port therethrough extending inwardly to the output portion of the stepped bore, the input portion of the stepped bore having a larger diameter than does the intermediate portion, which has a larger diameter than does the output portion;

an elongate sleeve member having a first end and a second end and being disposed in the input portion of the stepped bore with its first end proximate the input end of the housing, the sleeve member having a sleeve recess concentrically extending inwardly from its second end along the main axis, the sleeve member also having a sleeve member central bore extending from its first end to the sleeve recess;

a pressure regulator piston having a first end and a second end and an elongate skirt portion slidably received within the sleeve recess, the pressure regulator piston also having a shoulder portion slidably received within the intermediate portion of the housing, the pressure regulator piston having a leading portion extending from the shoulder portion to the second end thereof, the leading portion having a diameter smaller than that of the skirt portion, which has a diameter smaller than does the shoulder portion, the leading portion having therewithin a leading portion recess concentrically extending along the main axis inwardly from the second end of the pressure regulator piston to the shoulder portion, the pressure regulator piston having a central piston bore concentrically extending along the main axis from the first end of the pressure regulator piston to the leading portion recess, the diameter of the central piston bore linearly decreasing near the leading portion recess to form a valve ball seat;

a piston spring disposed between the sleeve member and the shoulder portion of the pressure regulator piston to resiliently bias the shoulder portion against the piston stop;

a ball locating member being fixedly disposed within the leading portion recess and having a ball locator extending into the central piston bore to a point proximate the valve ball seat;

a ball spring retainer fixedly disposed within the central piston bore proximate the first end of the pressure regulator piston;

a valve ball disposed within the central piston bore; and a ball spring disposed between the valve ball and the ball spring retainer to resiliently urge the valve ball against the ball locator when the shoulder portion of the pressure regulator piston is against the piston stop and to resiliently urge the valve ball against the valve ball seat when the shoulder portion has been forced away from the piston stop.

* * * * *